United States Patent [19]

Vitellaro

[11] 4,385,426

[45] May 31, 1983

[54] CUTTING OF WIRE-REINFORCED HOSE

[75] Inventor: Frank A. Vitellaro, Trenton, N.J.

[73] Assignee: Dayco Corporation, Dayton, Ohio

[21] Appl. No.: 210,065

[22] Filed: Nov. 24, 1980

[51] Int. Cl.[3] .................... B23D 23/04; B21F 11/00

[52] U.S. Cl. .................... 29/33 T; 83/54; 83/482; 83/519

[58] Field of Search .................... 29/33 T; 83/519, 482, 83/354, 907, 370, 54, 188, 185

[56] References Cited

U.S. PATENT DOCUMENTS

| | | | |
|---|---|---|---|
| 1,489,716 | 4/1924 | Rupe | 83/188 |
| 2,543,220 | 2/1951 | Ardell | 83/354 X |
| 2,547,375 | 4/1951 | Chernack | 83/519 X |
| 2,554,555 | 5/1951 | Bissell et al. | 83/354 X |
| 2,779,407 | 1/1957 | Thomsen | 83/188 X |
| 2,829,983 | 4/1958 | De Gain | 83/188 X |
| 2,946,250 | 7/1960 | Bahr | 83/519 X |
| 3,036,605 | 5/1962 | Joa | 83/354 |
| 3,332,326 | 7/1967 | Haas | 83/482 X |
| 3,777,607 | 12/1973 | Schofield | 83/482 |
| 3,972,214 | 8/1976 | Jagersberger | 83/907 X |

*Primary Examiner*—William R. Briggs
*Attorney, Agent, or Firm*—Joseph V. Tassone

[57] ABSTRACT

An apparatus and method for cutting a flexible hose which has an axially extending helically wound reinforcing wire during continuous forming of the hose around a mandrel are provided wherein the apparatus comprises, means for determining length increments of the formed hose, a pair of cooperating cutters for cutting the formed hose based on each determined length increment with the cutters comprising a rotary cutter for cutting the flexible portion of the hose and a chisel cutter for cutting the wire of the hose and with the cutters being operatively connected to the determining means, a first and a second fluid powered cylinder for operating the cutters, first connecting means operatively connecting the first cylinder to the rotary cutter, second connecting means operatively connecting the second cylinder to the chisel cutter, and control means for sequentially actuating the cylinders in response to each determined length increment of the formed hose. A marking apparatus and method for such a flexible hose are also provided.

9 Claims, 6 Drawing Figures

CUTTING OF WIRE-REINFORCED HOSE

CROSS-REFERENCE TO RELATED APPLICATION

This application is related to application Ser. No. 210,064, filed Nov. 24, 1980.

BACKGROUND OF THE INVENTION

1. Field of the Invention

This invention relates to an apparatus and method for cutting and marking hose which is flexible and axially collapsible and extensible.

2. Prior Art Statement

It is known in the art to provide an apparatus and method for cutting a flexible hose which has an axially extending helically wound reinforcing wire during continuous forming of the hose around an associated mandrel wherein the apparatus utilizes cam mechanisms for determining length increments of the formed hose and pair of cooperating cutters consisting of a rotary cutter and a chisel cutter which are also cam operated and operatively connected to the above-mentioned cam mechanisms and as disclosed in U.S. Pat. No. 2,547,375.

It is also known to provide a cutting apparatus and method similar to the above which utilizes an electrical switch which is engaged by the completed flexible hose and cooperates with associated cam mechanisms to determine length increments of the flexible hose, and as disclosed in U.S. Pat. No. 2,554,555.

It would also be possible to employ mechanical cam mechanisms of the character mentioned in the above patents, to determine hose length increments which could be used for the purpose of marking of a flexible hose of the character mentioned.

SUMMARY

It is a feature of this invention to provide an improved apparatus for cutting a flexible hose which has an axially extending helically wound reinforcing wire during continuous forming of the hose around a mandrel wherein the apparatus comprises means for determining length increments of the formed hose, a pair of cooperating cutters cutting the formed hose based on each determined length increment with the cutters comprising a rotary cutter for cutting the flexible portion of the hose and a chisel cutter for cutting the wire of the hose and wherein the cutters are operatively connected to the means for determining length increments.

For example, in accordance with one embodiment of such cutting apparatus, a first and a second fluid powered cylinder are provided for operating the cutters with first connecting means operatively connecting the first cylinder to the rotary cutter, second connecting means operatively connecting the second cylinder to the chisel cutter, and control means for sequentially actuating the cylinders in response to each determined length increment of the formed hose.

Another feature of this invention is to provide an apparatus of the character mentioned in which the means for determining length increments of the formed hose provides such length increments substantially free of error utilizing an electrical system.

Another feature of this invention is to provide an improved apparatus for marking a flexible hose during continuous forming of the hose around an associated stub mandrel wherein the apparatus comprises means for determining length increments of the formed hose and means for marking the formed hose based on each determined length increment.

For example, in accordance with one embodiment of such marking apparatus, a marking nozzle is provided for receiving a marking liquid therethrough together with a system for providing and forcefully ejecting a minute volume of the marking liquid through the nozzle and against the formed hose based on each determined length increment while maintaining the nozzle in spaced relation from the hose.

Another feature of this invention is to provide an improved method for cutting and marking a flexible hose of the character mentioned.

Therefore, it is an object of this invention to provide an improved apparatus and method for continuously cutting and marking a flexible hose having one or more of the novel features set forth above or hereinafter shown or described.

Other details, features, uses, objects, and advantages of this invention will become apparent from the embodiments thereof presented in the following specification, claims, and drawings.

BRIEF DESCRIPTION OF THE DRAWINGS

The accompanying drawings show present preferred embodiments of this invention, in which.

DETAILED DESCRIPTION

Overall Description

Figure 1:
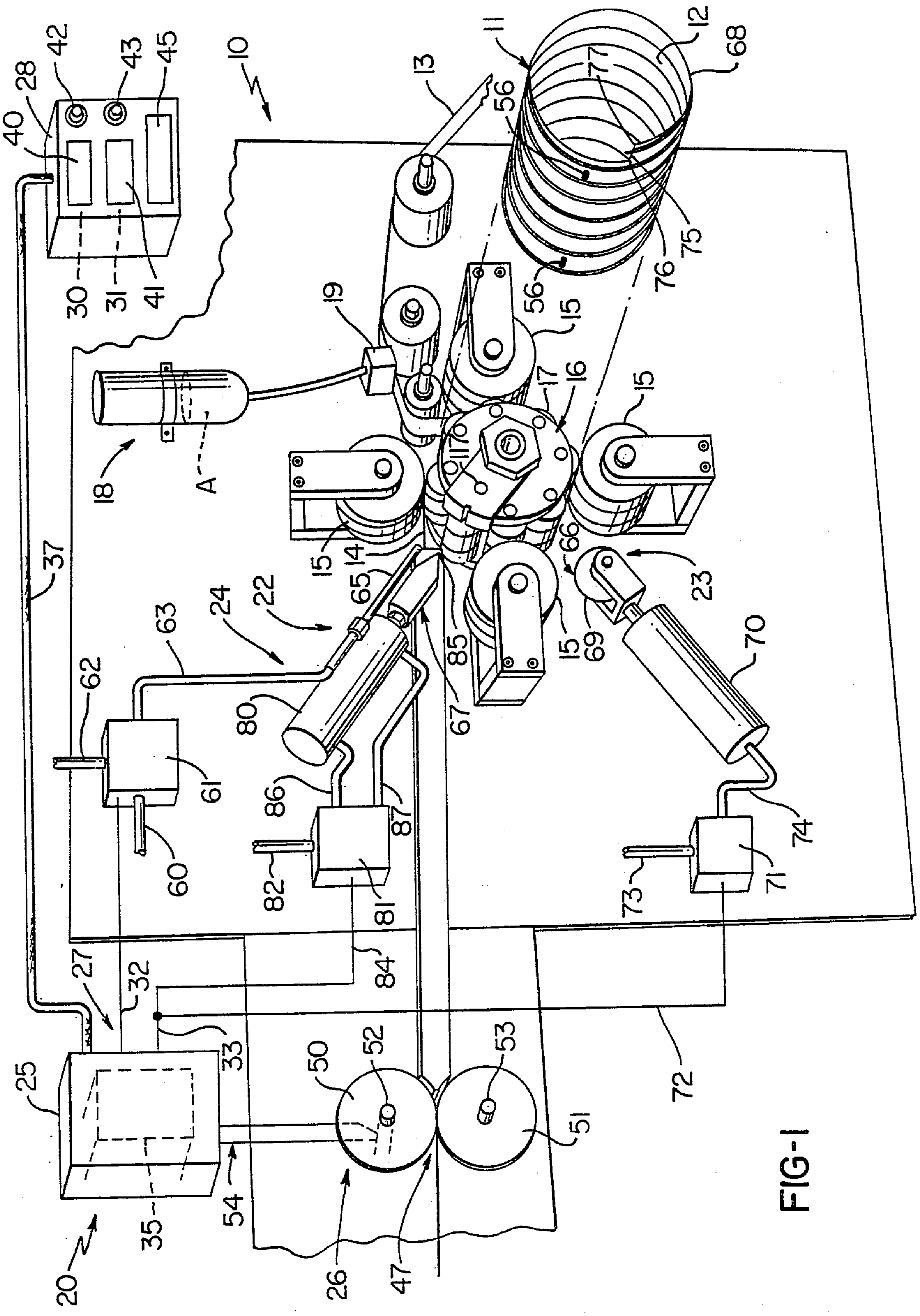
FIG. 1 is a view of an exemplary machine which utilizes an exemplary apparatus and method of this invention with parts shown isometrically, other parts are shown schematically, and parts broken away; and also illustrating a portion of the hose made by such machine.

Reference is now made to FIG. 1 of the drawings which illustrates a fragmentary portion of an exemplary machine which utilizes the apparatus and method of this invention and such machine is designated generally by the reference numeral 10. The machine 10 is particularly adapted for continuously forming a reinforced flexible hose which is designated generally by the reference numeral 11.

The hose 11 is highly flexible and has a smooth inside surface 12 yet such hose has considerable strength against collapse or bursting thereof due to the reinforcement provided therein and such reinforcement will be described subsequently. The hose 11 is defined by a first elongate member or strip 13 made of a polymeric material and a second elongate member or wire 14 which defines a reinforcing material. The hose 11 is typical of hose of this type and is also readily axially extensible and collapsible from a nominal position thereof.

The machine 10 comprises means for helically forming the strip 13 with portions of adjoining helical turns thereof in adjoining overlapping relation and such means for helically forming the strip 13 comprises a plurality of cooperating grooved outer rollers each designated by the same reference numeral 15 and an inner stub mandrel 16 having cooperating rotatable grooved rollers 17 with a typical one of such rollers being designated by the reference numeral 17. The machine 10 also has means for helically forming and disposing the wire 14 in sandwiched relation between the overlapped portions of the adjoining helical turns of the strip 13 and such means for helically forming and disposing the wire 14 is comprised of the cooperating rollers 15, stub mandrel 16 with its rollers 17, and preform rolls (not shown) of a type known in the art which are used to provide a preformed convolution or so-called "kick" in the wire 14 before introduction thereof between the portions of the adjoining helical turns which are to be overlapped. Because the portions of the machine 10 which provide the helical forming of the strip 13 and wire 14 and the disposal of wire 14 between the overlapped portions of the adjoining helical turns are well known in the art, a further description thereof will not be presented herein.

The machine 10 also has means 18 for bonding the portions of the adjoining turns of the strip 13 with the wire 14 therebetween to define the flexible hose 11 as a reinforced hose. The bonding means 18 comprises a reservoir which contains an adhesive A and supplies same through a conduit and applicator assembly 19 to a portion of the strip 13 to be overlapped, as described above, prior to helical forming thereof. The adhesive A may be any suitable adhesive which is compatible with the strip 13; however, it is to be understood that any bonding means known in the art may be used.

The machine 10 has means for determining length increments of the formed hose 11 during forming and such determining means is designated generally by the reference numeral 20. The machine 10 also has means for operating on the formed hose during forming based on each determined length increment and such operating means is designated generally by the reference numeral 22. The operating means 22 is operatively connected to and activated by the determining means 20; and, in this example of the invention the operating means comprises formed hose cutting means 23 and formed hose marking means 24 which will be described in more detail subsequently.

In accordance with the teachings of this invention the means for determining length increments of the formed hose 11 comprises a device which is also designated by the reference numeral 20 for determining the straight length of one of the members 13 or 14; and, in this example the device 20 determines the straight length of the wire 14 prior to forming thereof. The device 20 utilizes the straight length of the wire 14 to provide the specified length increments. The device 20 comprises an electrical apparatus 25, means 26 providing an input to the apparatus 25 as a function of the straight length of the wire 14, and means 27 providing output means from the electrical apparatus 25 for activating the operating means 22 which may comprise activating the cutting means 23, marking means 24 or both means 23–24.

The electrical apparatus 25 also has length setting means enabling setting of such apparatus so that the means 27 providing the output means provides same at any desired length increment and such length setting means is in the form of a setting apparatus 28 which is provided in a remote control assembly 28; and, such assembly 28 has a first 30 and a second 31 length setting means therein. The first length setting means 30 enables setting the electrical apparatus 25 so that the means providing output means 27 from apparatus 25 provides a first output, through electrical conductors 32, at any desired axial length which defines a first desired length increment of the formed hose 11. The first output through conductors 32 operates the marking means 24 after setting thereof employing the first setting means 30. The second length setting means 31 enables setting of the electrical apparatus 25 so that the means providing output means 27 from apparatus 25 provides a second output through electrical conductors 33, at any desired axial length which defines a second desired length increment of the formed hose 11 which is generally larger than the first length increment of such hose. The second output through conductors 33 operates the cutting means 23 to cut the specified second length increment after setting thereof employing the second setting means 31.

The electrical apparatus 25 has a main electrical circuit 35 which is operatively connected to the remote assembly 28 by electrical connection means such as an electrical cable assembly 37. The assembly 28 also has first 40 and second 41 visual display means for displaying the first and second length setting respectively and the first 30 and second 31 length setting means comprise first and second manual setting means in the form of rotatable setting knobs 42 and 43 respectively.

The electrical apparatus 25 of this example also has a production counter which provides a running total of the length of hose 11 produced by the machine 10. This counter is an integral part of the electrical circuit and a visual display of the total length is provided on a visual display means 45 on the assembly 28.

The means 26 providing an input to the electrical apparatus 25 comprises means providing a rotary input as a function of the straight length of the wire 13. For example, the wire 14 is provided on a suitable supply spool (not shown) and passed through the nip 47 of a pair of cooperating circumferentially grooved wheels 50 and 51. The wheels 50 and 51 engage diametrically opposed portions of the wire 14 and the operation of the wheels is such that as the wire moves through the nip 47 the rotary motion of such wheels is a function of the straight length of the wire 14 moving therethrough. The wheels 50 and 51 are rotatably supported on associated shafts 52 and 53 and the shaft 52 of the wheel 50 in this example is connected to provide a rotary input into the electrical apparatus 25 through a mechanical connection 54 suitably connected between the shaft 52 and the electrical apparatus 25. This mechanical rotary input into the apparatus 25, and in particular to the circuit 35 thereof, is used by components of the circuit 35 and correlated with the diameter of the hose being formed by the machine 10 and the helix angle that the wire 14 is wound in the hose 10 while compensating for normal mechanical slippage and lost motion in the machine 10, performance accuracy limits of the electrical components of apparatus 25, and tension or slack in the wire 14 between the wheels 50–51 and the wire forming rollers whereby for any desired length of finally formed hose 11 a corresponding known straight length of wire 14 is required.

Thus, with this machine and method 10 the electrical apparatus 25 is set through the use of the knobs 42 and 43 so that as a function of the straight length of the component wire 14 used to make the hose 11, marking of the completed hose 11 is provided at predetermined intervals set by the setting means 30; and, at a predetermined setting set by the setting means 31 a desired length of the hose 11 is cut. In a typical application for 4 inch diameter hose 11 made of a strip 13 of polyvinyl chloride which is reinforced by a copper clad steel wire 14 of 0.037 inch diameter, the setting means 30 provided hose marking at four inch intervals in the form of spaced paint marks 56 and the setting means 31 provided for cutting away each 6 foot length of the hose 11.

The marking means 24 may be of any suitable type known in the art; however, such marking means 24 preferably comprises a supply conduit 60 which supplies marking means in the form of marking paint from a suitable pressurized supply reservoir through a control valve 61. The valve 61 is supplied with air under controlled pressure from a suitable source by a conduit 62 and a conduit 63 extends from the valve 61 to a paint applying nozzle 65 which is mounted at a stationary position with respect to the mandrel 16 and hose 11 formed therearound. The marking means 24 operates in a similar manner as a paint spray gun and upon being provided with appropriate output signals through conductor 32, high pressure air from the conduit 62 and controlled by valve 61 provides a momentary ejector action through the valve 61 which causes a small amount of paint to be ejected from its reservoir and propelled against the outside surface of the hose 11 to form a mark 56 in the form of a paint spot 56 which is dried by ambient air within seconds after application.

The hose cutting means 23 of this example comprises a pair of cooperating cutters shown as a rotary cutter 66 and a chisel cutter 67. The cutters 66 and 67 are controlled by the electric apparatus 25 based on the length setting means 31 and the electrical system 35 of the apparatus 25 provides a suitable output through conductor 33 for first activating the rotary cutter 66 once the desired set length of hose 11 has been reached and then activating the chisel cutter 67.

The rotary cutter 66 is a pizza-type cutter which provides a helical cut 68 upon being urged against the outside surface of the hose 11 sandwiching such hose between an associated roller 17 of the mandrel 16. The helical cut 68 is provided because the cutting action by cutter 66 is provided during continuous forming of the hose 11 and the cut 68 is provided between immediately adjacent turns of the helical wire 14. The rotary cutter 66 has a rotary cutting edge 69 which is urged into cutting engagement by a spring retracted air cylinder 70 which is controlled by a valve 71. The valve 71 is provided with electrical signals through an electrical conductor 72 extending from the conductor 33 connected to system 35. Air under controlled pressure, for operating the air cylinder 70, is provided to the valve 71 through a conduit 73 from a suitable supply source and a conduit 74 extends between the valve 71 and cylinder 70. The action of the pressurized air through conduit 74 is controlled by the valve 71. The inherent design of the electrical system 35 provides appropriate signals to the valve 71 to keep the rotary cutter 66 in cutting engagement against the hose 11 through an arc of 360° and inasmuch as the hose 11 is being continuously formed during this cutting the helical cut 68 is provided as previously described. Once the cut 68 is completed the electrical system 35 of the apparatus 25 activates the chisel cutter 67 to provide a transverse cut 75 between the ends 76 and 77 of the helical cut 68.

The chisel cutter 67 is operated by an air cylinder 80 which is extended and retracted by a control valve 81 which is provided with air under regulated pressure from a suitable source through a conduit 82. The valve 81 is provided with appropriate electrical signals from the electrical system 35 through conductor 84 connected to the conductor 33. The cutter 67 has a chisel cutting edge 85 which is extended into cutting engagement to provide cut 75 by air under pressure provided to the rear of cylinder 80 by conduit 86. The chisel blade 85 is retracted by pressurized air provided to the front of the cylinder 80 by conduit 87. The electrical circuit controls the valve 81 so that the blade 85 provides its cut and is retracted in a time frame generally of the order of milliseconds.

Additional Description of the Hose Cutting Means

The hose cutting means or apparatus 23 comprises the rotary cutter 66 and the chisel cutter 67 as previously described and such cutters are controlled by the electrical apparatus 25. The electrical apparatus 25 comprises control means for sequentially actuating the fluid powered cylinders or air cylinders 70 and 80 for the cutters 66 and 67 respectively; and the control of cylinders 70 and 80 is in response to each determined length increment as determined by the device 20.

Figure 2:
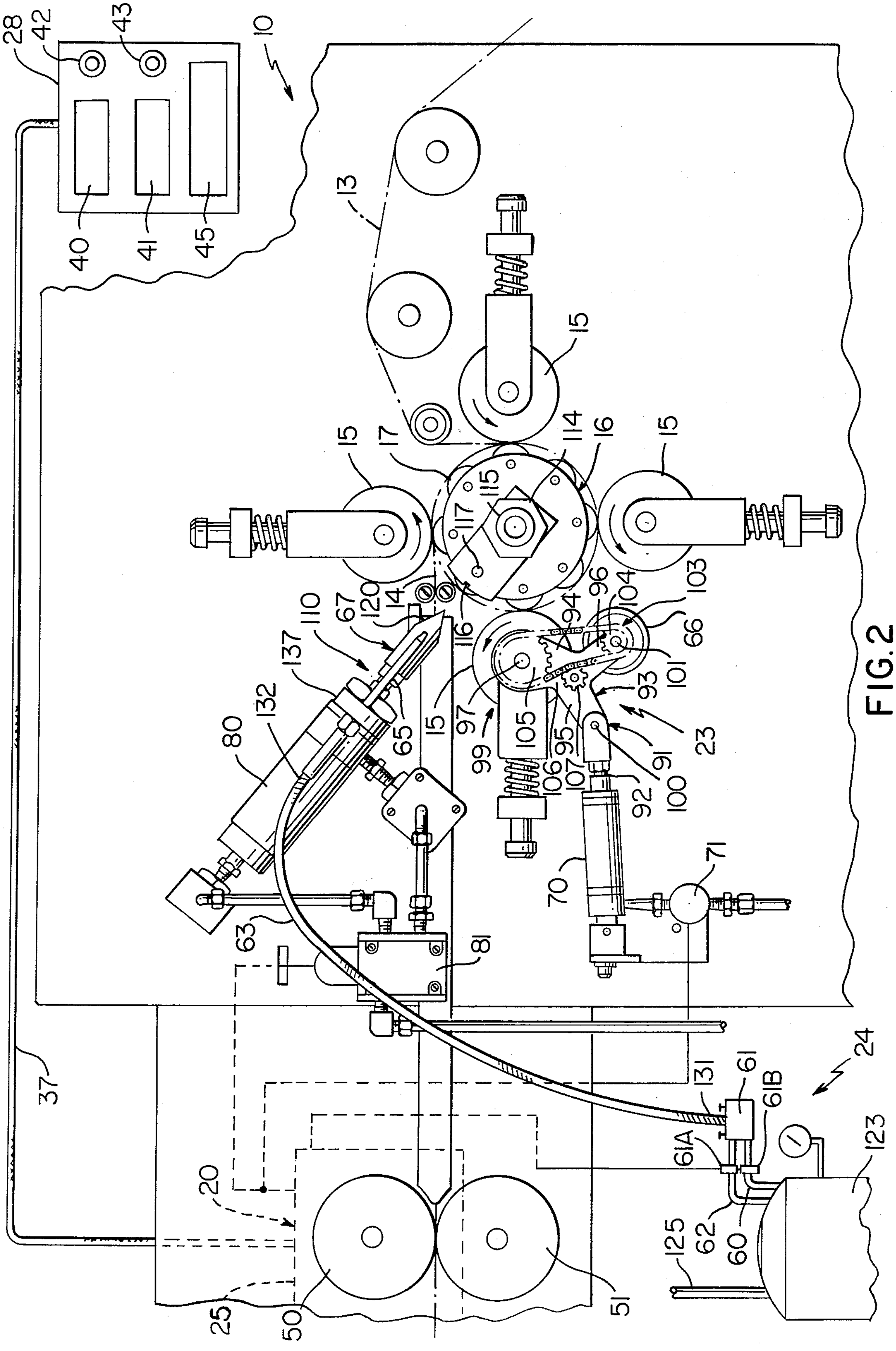
FIG. 2 is a view of the machine of FIG. 1 looking perpendicularly toward the front end of the mandrel.
Figure 3:
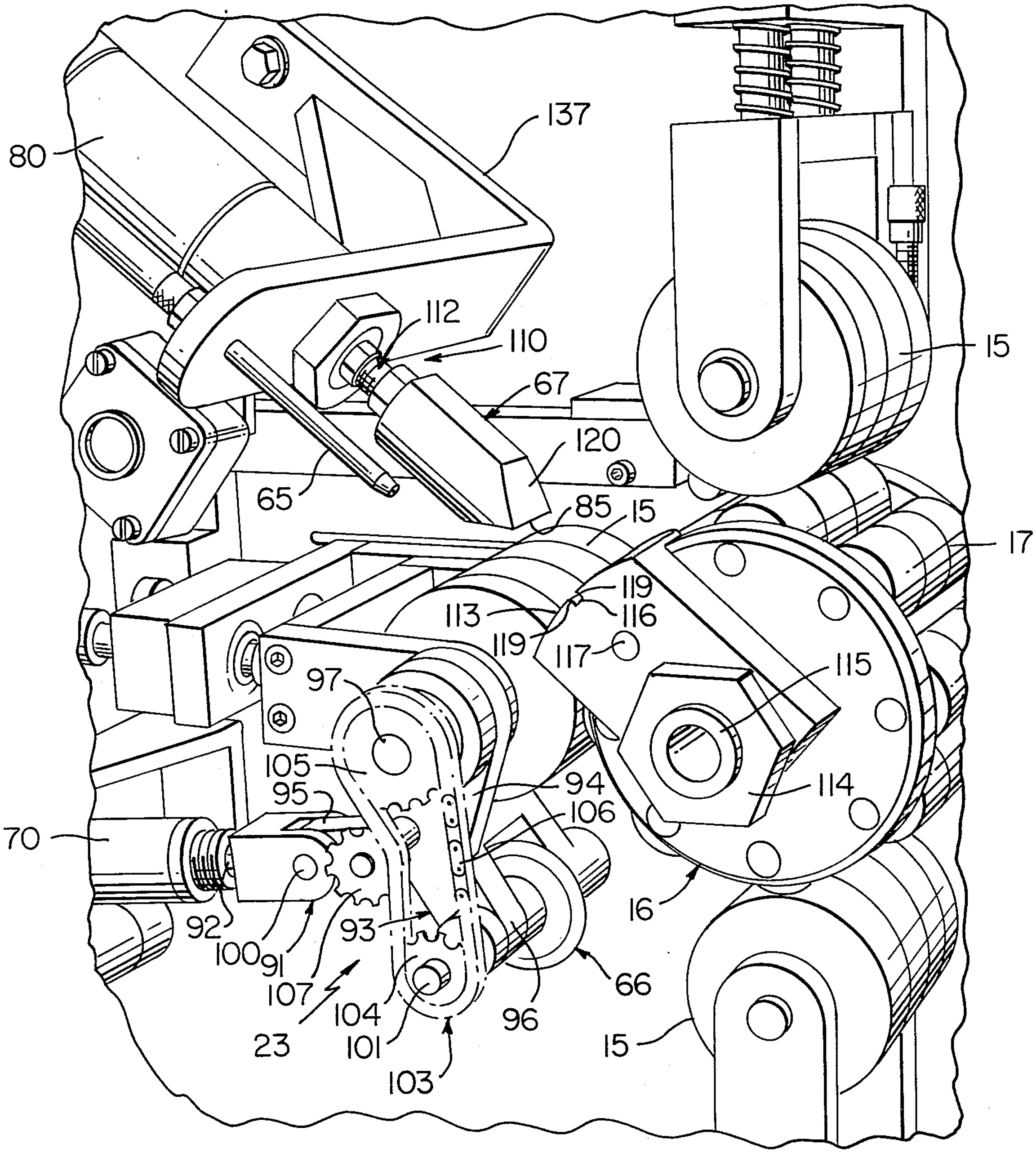
FIG. 3 is an enlarged isometric view particularly illustrating cooperating cutters of the cutting apparatus and a marking nozzle of the hose marking means.

As best seen in FIGS. 2 and 3, the apparatus 23 has first means designated generally by the reference numeral 91 operatively connecting the cylinder 70 to the rotary cutter 66 and the connecting means 91 comprises a telescoping end 92 extending from the cylinder 70 and a support link 93 connected to the end 92 and pivotally supporting the rotary cutter 66 adjacent the stub mandrel 16. The support link 93 is a roughly Y-shaped link, as viewed from the side thereof - such as in FIG. 2, and the Y-shaped link 93 is defined by a leg 94 and a pair of arms 95 and 96 extending from one end of the leg.

The rotary cutter 66 has means pivotally supporting the leg 94 for pivoting movement and such means comprises a fixed shaft 97 which also serves as a support for one of the forming rollers 15 as shown at 99. The link 93 is pivotally fastened to the telescoping end 92 by a pivot pin 100 connected between its arm 95 and the end 92. The rotary cutter 66 also has a rotatable shaft 101 which rotatably supports such cutter 66 on the arm 96 of the Y-shaped link 93.

Figure 5:
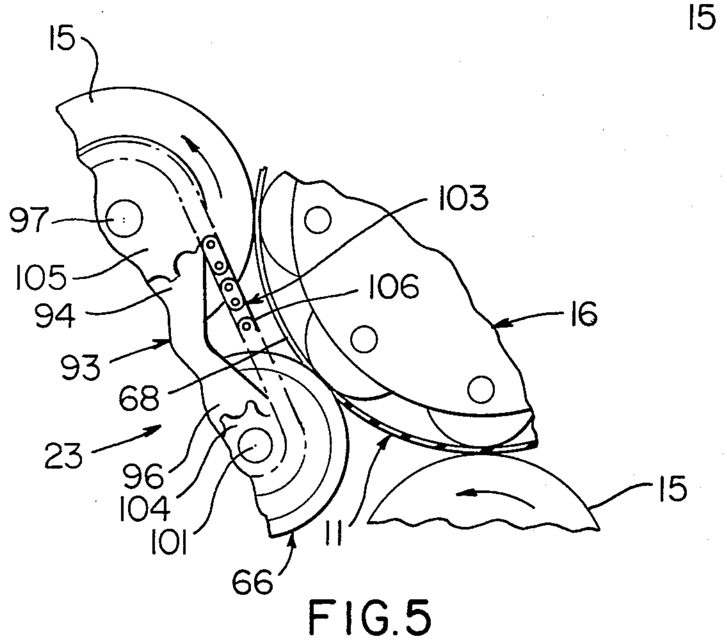
FIG. 5 is a fragmentary view particularly illustrating the action of the rotary cutter of the cutting apparatus.

The rotary cutter 66 has a drive 103 for rotating such cutter and in this example of the invention the drive is a chain drive system 103. The chain drive system is rotated or powered by the shaft 97 which provides continuous rotation of the shaft 101 and cutter 66 supported thereon while the rotary cutter 66 is in cutting engagement as shown in FIG. 5 as well as while the rotary cutter 66 is out of cutting engagement as shown in FIGS. 2 and 3. The chain drive system 103 comprises a sprocket wheel or sprocket 104 (FIGS. 3 and 5) which is keyed to the shaft 101 and the sprocket 104 is powered or driven by another sprocket 105, which is keyed to the shaft 97, and a sprocket chain 106 operatively connected between the sprockets 104–105. An idler sprocket 107 is also provided and rotatably supported on the Y-shaped link 93 and the sprocket 107 is adjustable to take up any undesired slack in the chain 106, as is known in the art.

The apparatus 23 has connecting means 110 (FIGS. 2 and 3) operatively connecting the cylinder 80 to the chisel cutter 67 and such connecting means comprises a telescoping end 111 extending from the cylinder 80 and means 112 detachably fastening the chisel cutter 67 to the telescoping end 111. In this example the means 112 comprises cooperating threads on the telescoping end and chisel cutter 67 which enable the detachable fastening action to be provided.

The cutting apparatus 23 has a backup anvil 113 for its chisel cutter 67 and means in the form of a threaded nut 114 for fastening the anvil 113 on the stub mandrel 16. The nut 114 has internal threads which are threadedly engaged with external threads provided on a central shaft portion 115 extending from the stub mandrel 16. The anvil 113 has a locating pin 117 which is used to position such anvil on the stub mandrel 16, in a precise manner. The anvil 113 also has a substantially rectangular slot 116 in the terminal end portion thereof (FIGS. 3 and 6) and such slot is provided for a purpose now to be described.

The chisel cutter has a sharp V-shaped outer end portion 120 terminating in the cutting edge 85. The rectangular slot 116 is particularly adapted to receive the cutting edge 85 therewithin to provide the transverse cut 75 in the polymeric material and the cut through the wire 14. As previously described, the transverse cut 75 is a cut of the polymeric material between the ends 76 and 77 of the helical cut 68 and a cut through the wire 14.

Figure 6:
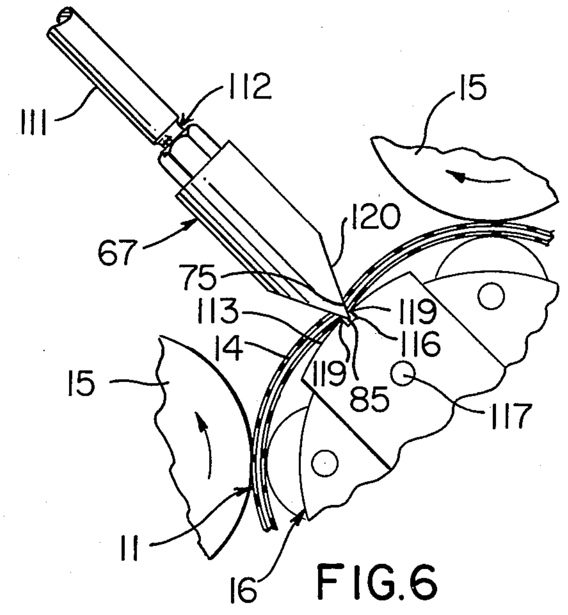
FIG. 6 is a view with parts in elevation, parts in cross section, and parts broken away particularly illustrating the action of the chisel cutter of the cutting apparatus.

As shown in FIG. 6, the dimensions of slot 116 and the outer portion 120 of cutter 67 with its cutting edge 85, together with the relative positioning of the anvil 113 and chisel cutter 67 are such that with the edge 85 in full cutting engagement it does not physically contact the anvil 13. In this manner the transverse cut 75 provided in the polymeric material of the hose 11 and the wire 14 is in the form of a shear cut, i.e., the wire 14 and polymeric material of the hose are supported at the open end of the slot 116 between opposed parallel edges 119 of such slot and sheared once the cutting edge 85 is moved in cutting engagement.

Additional Description of the Hose Marking Means

Figure 4:
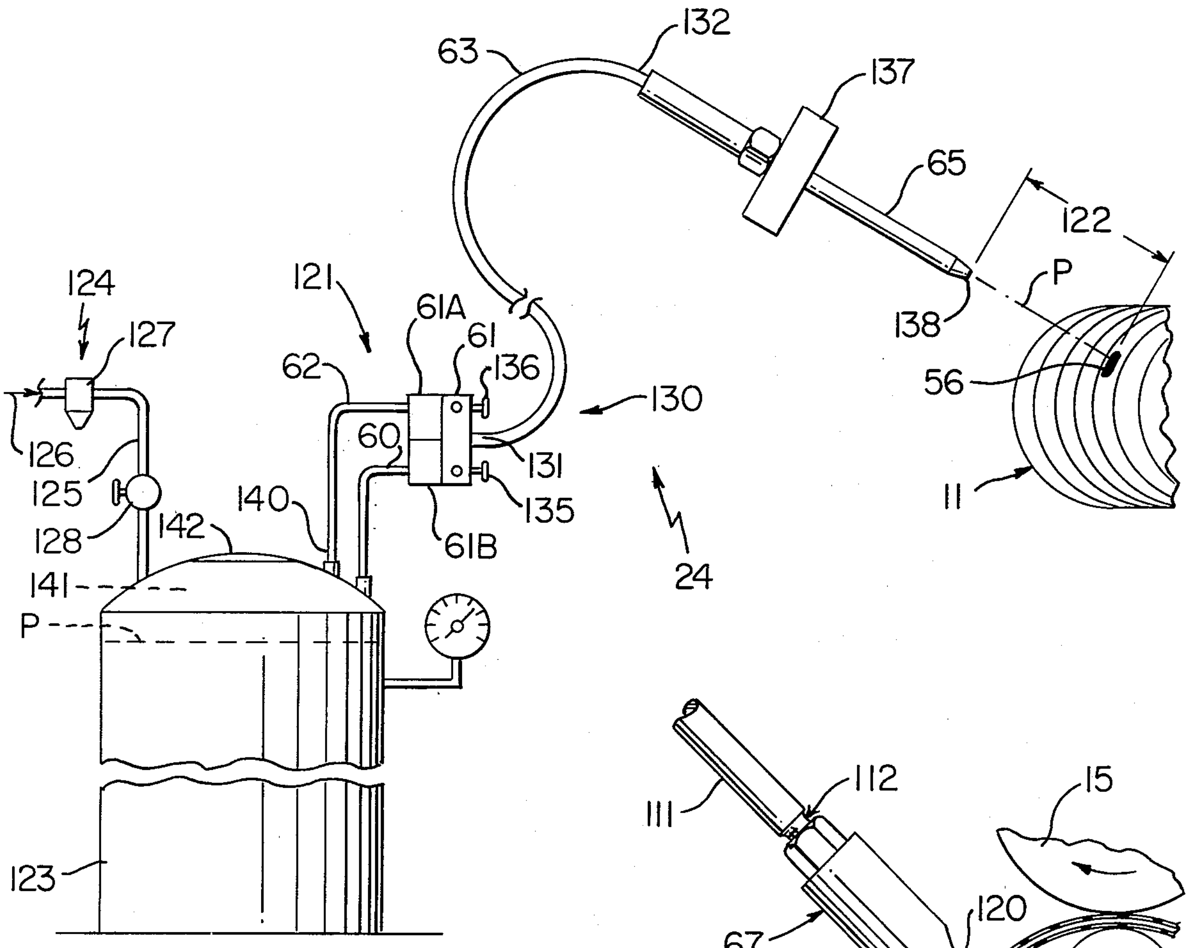
FIG. 4 is a view with parts in elevation, parts shown schematically, and parts broken away particularly illustrating the marking apparatus and method utilized to mark the formed flexible hose.

The hose marking means or apparatus 24 provides marking of the flexible hose 11 during continuous forming thereof around the stub mandrel 16 as previously described, once a desired length increment which is to be marked has been determined by the determining means 20. The marking apparatus 24 comprises the previously mentioned marking nozzle 65 which receives the marking liquid or paint P therethrough and a system 121 (FIG. 4) for providing and forcefully ejecting a minute volume of the marking liquid through the nozzle 65 and against the formed hose 11, to define the paint mark 56 on such hose, based on each determined length increment and while maintaining the nozzle 65 in spaced relation from the hose by a distance 122 which may be generally of the order to several inches.

The system 121 is a pressurized system and provides each minute volume of paint P which defines each paint mark or spot 56 which is ambient air driable within a time period generally of the order of seconds. Accordingly, the properties of the paint used are such that each mark 56 is sufficiently dry by the time a length of hose 11 having paint marks 56 thereon is cut away by the cutting apparatus 23 that the cut length may be handled without tendency for the paint marks 56 to smear.

The system 121 comprises a reservoir 123 and pressurizing means 124 for maintaining the paint in the reservoir under a controlled gaseous pressure and in this example of the invention the pressurizing means 124 comprises a first air conduit 125 which has its outlet in fluid flow communication with the reservoir 123 and its inlet in flow communication with suitable air pressure source such as a source 126 of shop air. A filter 127 is provided in the conduit 125 for filtering contaminants such as solid particles and water moisture followed by an adjustable air pressure regulator 128 which comprises the pressurizing means and precisely controls the magnitude of the air pressure.

The system 121 also has means 130 for supplying each minute volume of paint from the reservoir 123 to said nozzle 65 and such supplying means 130 comprises a first paint conduit 63 which has an inlet end 131 and an outlet end 132. The outlet end 132 of the conduit 63 is in flow communication with the nozzle 65. The supplying means 130 also has the control valve 61 comprising same and the control valve is operatively connected to the inlet end 131 of the paint conduit 63. The supplying means 130 also has a second air conduit 62 in fluid flow communication with the control valve 61 thereof and the conduit 62 provides air under regulated pressure therethrough. The control valve 61 has an ejector means in the form of an ejector valve portion 61A operatively associated therewith and such valve 61 also has a solenoid valve portion 61B.

The supplying means 130 also has the paint conduit 60 which has an inlet end in flow communication with paint P in the reservoir 123 and an outlet end in flow communication with the control valve 61. The solenoid valve portion 61B is an electrically operated solenoid valve 61B which controls flow of paint and pressurized air through the ejector means 61A to provide a momentary ejector action which causes a minute volume of paint (sufficient to define a paint mark 56) to be withdrawn from said reservoir 123 and propelled against an outside surface portion of the formed hose 11. The solenoid valve 61B is controlled by the electrical apparatus 25 as previously described.

The marking apparatus 24 also has means for adjusting the ejector means or valve portion 61A and in this example of the invention the means for adjusting such ejector means comprises a pair of threaded adjusting screws 135 and 136. The screw 135 operates to control the flow of marking liquid or paint through the ejector means 61A and the screw 136 operates to control the flow of pressurized air.

The nozzle 65 may be mounted adjacent the stub mandrel 16 using any suitable means such as a mounting bracket 137. The nozzle 65 also has a tip 138 which shapes each minute volume of paint passing therethrough so that it is in the form of a paint spot once the paint strikes the formed hose 11.

The conduit 62 for providing air under regulated pressure to the control valve 61 may provide air from any suitable source; however, in this example of the invention the conduit 62 has an inlet end 140 in flow communication with the volume 141 in the top of the reservoir 123 whereby air under controlled regulated pressure is provided from such volume to the valve 61 and hence the ejector means 61A of such valve. Thus, the air regulated by pressure regulator 128 is used to force paint P out of the reservoir 123 through conduit 60 and is also used as a supply for the conduit 62.

The reservoir 123 may be provided with suitable access and filling means and in this example an access port 142 is provided. The access port 142 is in the form of a threaded plug-like member which has outer male threads which are threadedly received within cooperating female threads in the top portion of the reservoir 123.

The paint P may be any suitable marking paint or liquid which dries as described earlier. Further, if desired, the drying may be further accelerated by the utilization of any suitable drying means. For example, such drying means may comprise a hot air nozzle (not shown) directed to impinge a blast of hot air against each paint mark 56.

The marking method of this invention utilizes the apparatus 24 to provide and forcefully eject minute volumes of paint through the nozzle 65 with its special tip 138 to define each paint mark 56. The construction, arrangement, and operation of components are such that each mark is defined with the tip 138 spaced from the hose 11 whereby the forming of hose 11 is not impeded in any way.

In this disclosure of the invention the drives, supports, power sources, controls, and the like for many components, subsystems, and systems have not been illustrated or described in detail. However, it is to be understood that these items which have not been presented in detail are suitably provided as is known in the art.

The electrical apparatus 25 of this example of the invention may be of any suitable construction known in the art and the circuitry thereof may be varied to accomplish the intended and above-described function and operation. Further, it is preferred that the setting of the electrical apparatus 25 be provided at a location adjacent the forming rollers 15 and mandrel 16 of the machine 10 as shown; and, in this application, a remote console assembly is provided for this purpose.

The elongate member or strip 13 utilized in making the hose 11 may be any suitable polymeric material known in the art and is preferably a thermoplastic polymer or copolymer, such as, for example ABS, polybutylene, EPDM, polypropylene, butadiene-styrene copolymers, polyurethane, polyvinyls, vinyl copolymers, and the like, including blends thereof. A presently preferred polymeric material is polyvinyl chloride. In addition, it will be appreciated that the strip 13 may be a plain ribbon or may have a groove therein for receiving the wire 14 and such groove may be preformed or formed during the helical winding thereof.

Similarly, the wire 14 may be made of any suitable reinforcing material including non-metallic material such as nylon, polypropylene, or the like or metallic material such as ferrous metal. Preferably the wire 14 is made of steel which has been suitably coated to resist corrosion.

While present exemplary embodiments of this invention and methods or practicing the same have been illustrated and described it will be recognized that this invention may be otherwise variously embodied and practiced within the scope of the following claims.

What is claimed is:

1. In an apparatus for cutting a flexible hose made primarily of polymeric material which has an axially extending helically wound reinforcing wire during continuous forming of said hose around a mandrel wherein said apparatus comprises means for determining length increments of the formed hose, said mandrel being a stub mandrel having a plurality of freely rotatable rollers therein, a plurality of freely rotatable forming rollers disposed about said stub mandrel for forming said hose thereon, a pair of cooperating cutters for cutting the formed hose based on each determined length increment, said cutters comprising a rotary cutter for cutting the flexible portion of said hose and a chisel cutter for cutting the wire of said hose, said cutters being operatively connected to said determining means, the improvement comprising, a first and a second fluid powered cylinder for operating said cutters, first connecting means operatively connecting said first cylinder to said rotary cutter, second connecting means operatively connecting said second cylinder to said chisel cutter, and control means for sequentially actuating said cylinders in response to each determined length increment of the formed hose, said control means providing actuation of said first cylinder to move said rotary cutter into cutting engagement followed by actuation of said second cylinder to move said chisel cutter in cutting engagement, said rotary cutter providing a helical cut in the polymeric material of said hose as a result of said rotary cutter urging same against an associated roller of said mandrel during said continuous hose forming and said chisel cutter providing a transverse cut in said polymeric material between the opposite ends of said helical cut while also simultaneously providing a cut through said wire, said first connecting means comprising a telescoping end extending from said first cylinder and a support link connected to said end and pivotally supporting said rotary cutter adjacent said stub mandrel, said link being pivotally mounted to one of said forming rollers, and said first connecting means further comprising a drive for rotating said rotary cutter, said drive comprising said one forming roller, said first cylinder serving to pivotally move said link to thereby move said rotary cutter into and out of cutting engagement.

2. A cutting apparatus as set forth in claim 1 in which said control means provides said actuation of said first cylinder and said movement of said rotary cutter to provide said helical cut which extends through an angle of 360° and said control means provides said actuation of said second cylinder to provide said transverse cut which is parallel to the longitudinal axis of said formed hose.

3. A cutting apparatus as set forth in claim 2 in which said support link is a roughly Y-shaped link when viewed from a side thereof, said Y-shaped link being defined by a leg and a pair of arms extending from one end of said leg, means pivotally supporting said leg for pivoting movement on said one forming roller, a pivot pin pivotally fastening said telescoping end of said first cylinder to one of said arms, and a rotatable shaft rotatably supporting said cutter on the other of said arms, said drive operating to provide continuous rotation of said rotatable shaft and rotary cutter while said rotary cutter is in and out of cutting engagement.

4. A cutting apparatus as set forth in claim 3 in which said drive comprises a chain drive system.

5. A cutting apparatus as set forth in claim 1 in which said second connecting means comprises a telescoping end extending from said second cylinder and means detachably fastening said chisel cutter to said telescoping end and further comprising a backup anvil for said chisel cutter, and means supporting said anvil on said stub mandrel such that said anvil is disposed within the formed hose during continuous forming thereof.

6. A cutting apparatus as set forth in claim 5 in which said means detachably fastening comprises cooperating threads on said telescoping end and said chisel cutter.

7. A cutting apparatus as set forth in claim 6 in which said chisel cutter has a V-shaped portion terminating in a cutting edge, said anvil has a rectangular slot in the terminal end thereof which is adapted to receive the cutting edge therewithin to provide said transverse cut in said polymeric material and said cut through said wire.

8. A cutting apparatus as set forth in claim 7 in which said second fluid powered cylinder is powered by air under controlled pressure, and said control means provides extension and retraction of said chisel cutter within a time frame generally of the order of a small fraction of a second.

9. A cutting apparatus as set forth in claim 7 in which said cutting edge and said rectangular slot are dimensioned such that said edge is in close proximity to yet out of contact with said anvil with said cutter in cutting engagement whereby said transverse cut in said polymeric material and said wire is a shear cut.

* * * * *